United States Patent
Fan et al.

(10) Patent No.: US 7,509,116 B2
(45) Date of Patent: Mar. 24, 2009

(54) SELECTIVE DATA EXCHANGE WITH A REMOTELY CONFIGURABLE MOBILE UNIT

(75) Inventors: Rodric C. Fan, Fremont, CA (US); Edward David Mleczko, San Jose, CA (US); Sean Dominic Taylor, Dedham, MA (US)

(73) Assignee: GenX Mobile Incorporated, San Jose, CA (US)

( * ) Notice: Subject to any disclaimer, the term of this patent is extended or adjusted under 35 U.S.C. 154(b) by 18 days.

(21) Appl. No.: 11/095,878

(22) Filed: Mar. 30, 2005

(65) Prior Publication Data

US 2006/0223516 A1 Oct. 5, 2006

(51) Int. Cl.
- H04M 11/00 (2006.01)
- H04M 1/66 (2006.01)
- H04M 1/68 (2006.01)
- H04M 3/16 (2006.01)
- H04M 3/00 (2006.01)
- H04W 24/00 (2006.01)

(52) U.S. Cl. ................ 455/405; 455/411; 455/419; 455/420; 455/456.1; 455/456.2; 340/870.11; 342/357.13; 370/252; 380/286; 701/29; 707/2; 707/100; 709/219

(58) Field of Classification Search .......... 455/405, 455/410, 411, 419, 407, 420, 456.2; 340/870.11; 707/2, 100; 380/286; 370/252; 342/357.13; 701/29; 709/219
See application file for complete search history.

(56) References Cited

U.S. PATENT DOCUMENTS

| | | | |
|---|---|---|---|
| 5,295,261 A * | 3/1994 | Simonetti | 707/2 |
| 5,748,104 A * | 5/1998 | Argyroudis et al. | 340/870.11 |
| 5,917,911 A * | 6/1999 | Dabbish et al. | 380/286 |
| 5,953,722 A * | 9/1999 | Lampert et al. | 707/100 |
| 5,959,577 A * | 9/1999 | Fan et al. | 342/357.13 |
| 6,292,657 B1 * | 9/2001 | Laursen et al. | 455/411 |
| 6,522,876 B1 * | 2/2003 | Weiland et al. | 455/414.1 |
| 6,611,739 B1 * | 8/2003 | Harvey et al. | 701/29 |
| 6,658,562 B1 * | 12/2003 | Bonomo et al. | 713/1 |
| 6,662,014 B1 * | 12/2003 | Walsh | 455/456.2 |
| 6,757,719 B1 * | 6/2004 | Lightman et al. | 709/219 |
| 6,895,240 B2 * | 5/2005 | Laursen et al. | 455/420 |
| 7,027,808 B2 * | 4/2006 | Wesby | 455/419 |
| 2001/0025280 A1 * | 9/2001 | Mandato et al. | 707/3 |
| 2002/0061754 A1 * | 5/2002 | Takano | 455/456 |
| 2002/0112052 A1 * | 8/2002 | Brittingham et al. | 709/224 |
| 2004/0162063 A1 * | 8/2004 | Quinones et al. | 455/419 |
| 2006/0007870 A1 * | 1/2006 | Roskowski e al. | 370/252 |
| 2006/0223495 A1 * | 10/2006 | Cassett et al. | 455/405 |

* cited by examiner

*Primary Examiner*—William D Cumming
(74) *Attorney, Agent, or Firm*—MacPherson Kwok Chen & Heid LLP

(57) ABSTRACT

A system for remotely tracking a mobile unit is presented. The system includes a computer connected to a data network, mobile units collecting data and transmitting the data to the computer, and a configuration database connected to the data network. The configuration database stores configuration parameters for the mobile units. The mobile units are programmed to contact the configuration database upon being powered on, obtain the configuration parameters, and transmit the collected data to the computer according to the configuration parameters. Since each configuration file could apply to multiple mobile units, the system provides an efficient way to control the data reporting patterns of many mobile units. The configuration database may be organized in layers of configuration files for improved flexibility. Files from different layers can be mixed and matched and then applied to a group of mobile units.

34 Claims, 7 Drawing Sheets

| m.u. Identification No. | Layer 1 | Layer 2 | Layer 3 | Initialization time |
|---|---|---|---|---|
| A1 | CA | SF | A | 8/11 7:00am |
| A2 | CA | SF | C | 8/11 7:00am |
| A3 | WA | King | C | 8/11 9:12am |
| A4 | NY | | | |
| A5 | CO | | | |
| A6 | CO | | | |
| A7 | KS | | | |
| A8 | AL | | | |
| X247 | IN | | | |
| X248 | CA | | | |
| X249 | KS | | | |
| X250 | CA | | | |

FIG. 8

SELECTIVE DATA EXCHANGE WITH A REMOTELY CONFIGURABLE MOBILE UNIT

FIELD OF INVENTION

The invention relates generally to a system and method for mobile communication and particularly to a system and method for tracking statuses of mobile units.

BACKGROUND

Increasingly, industries rely on a fleet of dispatched mobile units to provide services or deliver products. For example, general contractors, utility providers, cable companies, appliance service providers, truck rental companies, taxi companies, airlines, police/fire departments, and various delivery services all utilize mobile units (e.g., vans, trucks, automobiles, airplanes) as part of their respective operations. When an operation involves numerous mobile units, it is often desirable, yet difficult, to obtain information about the dispatched mobile units. For example, it is desirable to know where the mobile units are at a given time. Also, the dispatching company may want to know if a mobile unit has been involved in an accident or if an employee driver is using the mobile unit in an inappropriate manner.

Locating a mobile unit is especially useful if it can be done from a remote management station, such as where the scheduling is done. This remote locating process usually entails two steps: determination of the position of the mobile unit, and transmission of the position data to the remote management station. One of the methods for determining the location of a mobile unit utilizes the Global Positioning System (GPS). The GPS involves a plurality of satellites orbiting the earth and sending out, at synchronized times, a code sequence that identifies the satellite. Along with this identification information is sent some positioning information that can be processed to determine a position. A GPS receiver receives the code sequence and the positioning information and passes it on to a processor. The processor determines the position of the GPS receiver by using well-known methods such as triangulation.

The position information as determined by the processor is then transmitted to a server that stores the information. Typically, this transmission from the GPS receiver to the server is achieved via a combination of wireless communication networks such as CDMA and the Internet. Further details of this system are provided in U.S. Pat. No. 5,959,577 ("the '577 patent).

While the system of the '577 patent accomplishes the goal of allowing remote management stations to obtain information about mobile units, it has several drawbacks that make the system unappealing to clients. One of the drawbacks is the lack of flexibility in changing the reporting patterns of the mobile units. The system of the '577 patent provides four modes in which the mobile units can operate, and the mode selection affects how often the mobile unit updates its position information. There is no mention in the '577 patent as to whether a single mobile unit always operates in the same mode or the mode is changeable. Thus, if the fleet management operator decides that he wants to see more frequent updates after the mobile units are dispatched, there is no way for the operator to change the update frequency.

Another drawback is the lack of scalability. Since the central server receives all the information collected by the mobile units and maintains a record of them, the amount of data that is stored becomes very large very fast. Given that each additional mobile unit takes up a lot of space in the database, it is difficult to add many mobile units to the system at once. If a company with a large fleet signs up for the system, the additional burden could cause the system to crash.

A system and method of providing mobile unit information (e.g., position information) in a more flexible and user-friendly manner is desired.

SUMMARY

In one aspect, the invention is a system for collecting data from a remote mobile unit. The system includes a configuration database containing a plurality of configuration files, each configuration file containing a configuration parameter that dictates a data reporting pattern. The mobile unit collects data and wirelessly accesses the configuration database to determine how to report the collected data before transmitting the data according to the configuration parameter.

In another aspect, the invention is a method of locating a mobile unit. The method includes determining an identification number of the mobile unit upon being contacted by the mobile unit through a data network, and locating a configuration file that is assigned to the identification number. The configuration file contains parameters that dictate how the mobile unit transmits its position data over the data network.

In yet another aspect, the invention is a mobile device that includes a global positioning system (GPS) receiver for receiving position data and a wireless transmitter for connecting to a data network. The wireless transmitter obtains a configuration parameter via the data network upon being powered up, and transmits position data to the data network according to the configuration parameter.

BRIEF DESCRIPTION OF THE DRAWINGS

FIG. 8 is an exemplary configuration file assignment table used by the computer to determine which configuration file applies to a particular mobile unit.

DETAILED DESCRIPTION OF THE PREFERRED EMBODIMENT(S)

Figure 1:
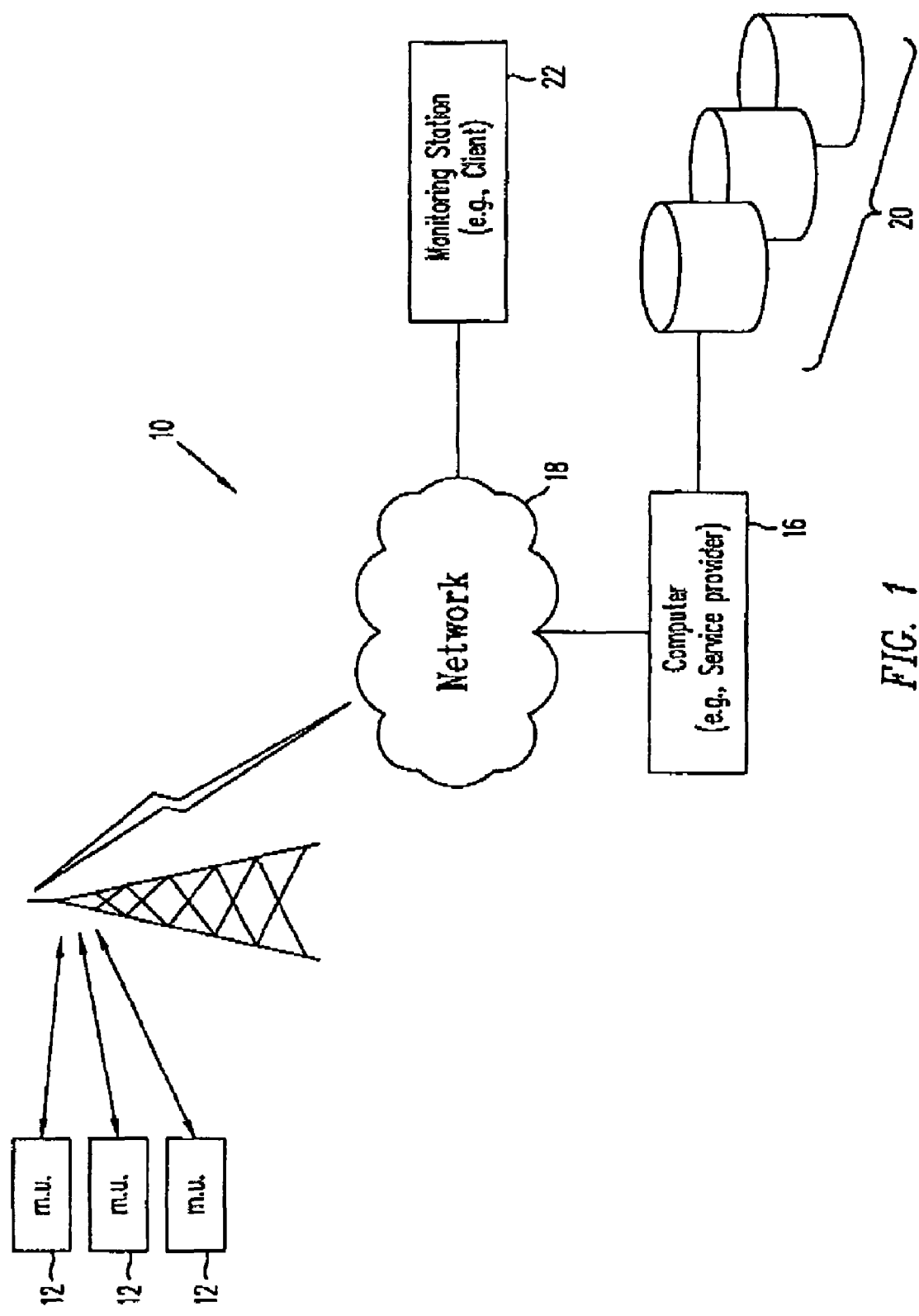
FIG. 1 discloses a system whereby a mobile unit transmits information to a remote computer wirelessly via a communication network.

Embodiments of the invention are described herein in the context of vehicle-installed devices and more specifically in the context of fleet management. However, it is to be understood that the embodiments provided herein are just preferred embodiments, and the scope of the invention is not limited to the applications or the embodiments disclosed herein.

As used herein, "position data" are data indicating a mobile unit's position, and may be in the form that needs some processing to be meaningful to computer 16 or a form that is already meaningful to the computer 16. A "computer," as used herein, is a commercially available device that has a processor, a memory, and a user interface, including a server. In the embodiments disclosed herein, the computer also has a means for communicating with the data network. A "configuration parameter" tells the mobile unit how often to transmit a certain type of data.

In the system of the invention, the distributed mobile units are initially all the same. These "generic" mobile units, which initially contain the same information, are configured to collect certain data (e.g., position data) and, upon first being powered-on, to contact the service provider's computer. The service provider's computer checks the identification number of the mobile unit that contacted it, and identifies the location of a configuration file that is specifically created for the contacting mobile unit. The service provider then directs the contacting mobile unit to the location of the configuration file. Each mobile unit is assigned to at least one configuration file. There is, however, no limit to the number of mobile units a configuration file applies to, and sometimes, a configuration file may not apply to any mobile unit. For example, in one instance involving 200 mobile units and three configuration files, the first configuration file may apply to 100 mobile units, the second configuration file may apply to 70 mobile units, and the third one may apply to 30 mobile units.

The configuration parameters in the configuration files are changeable, for example by the service provider. The system of the invention makes the change process easy to implement because the service provider only needs to change one configuration file to affect the reporting patterns of multiple mobile units. For example, by changing just the first configuration file in the above example, 100 mobile units will be affected.

The mobile units can be regrouped fairly easily as well. The service provider's computer may maintain a table of configuration file assignments indexed by mobile unit identification number. By changing the configuration file that is assigned to a specific mobile unit in the table, the mobile unit is effectively moved to a different group covered by a different configuration file. In the above example involving 200 mobile units, for example, changing the configuration file assignments for 10 mobile units could make the first configuration file apply to 90 mobile units, the second configuration file apply to 75 mobile units, and the third file apply to 35 mobile units. Thus, the reporting patterns of the mobile units can be altered efficiently at the service provider's computer.

In some embodiments, the configuration files are arranged in layers to provide more flexibility in regrouping the mobile units. Where there are, for example, three layers of files, a mobile unit may pull its configuration parameters from a file in each of the three layers. Another mobile unit may pull its configuration parameters from only two of the three layers because the operator did not want the third configuration file to apply to this mobile unit. Yet another mobile unit may pull its configuration parameters from all three layers, but use a different file than the other mobile unit in one of the layers. The number of possible permutations with parameter combinations is large, and can be controlled by the number of layers and the numbers of files per layer. The layers can contain different numbers of files. Configuration files may be deleted and created.

The service provider usually controls the configuration files. However, in some cases, the client (e.g., delivery service company) who has an account with the service provider may be able to directly control the configuration files with the service provider's permission.

Details of the invention will now be described in reference to the Figures.

FIG. 1 discloses a system 10 whereby a mobile unit 12 transmits information to a remote computer 16 wirelessly via a communication network 18. Any conventional wireless communication protocol, such as CDMA, may be incorporated into the system 10 to effectuate this wireless communication with the mobile unit 12. The computer 16 also communicates with a monitoring unit 22 through a communication network, which may be the network 18 or a separate network. The computer 16 is connected to a configuration database 20, which stores the configuration data for each of the mobile units 12. The specific configurations for the mobile units 12 are decided and submitted by the monitoring station 22. The monitoring station 22 may be able to access the configuration database 20 directly or through the computer 16. The computer 16 is controlled by the vehicle-tracking service provider, and the monitoring station 22 is usually at the site of the client (e.g., delivery company) who has an account with the service provider.

When a client first opens an account with the service provider, the service provider creates a configuration file assignment table that contains all the mobile units that the client wants to monitor. The configuration table is indexed by mobile unit identification number, so that the service provider can match up a mobile unit 12 with the proper configuration that the client intended for that particular mobile unit 12. The client may decide that they want certain reporting patterns from different mobile units depending on the nature of the delivery, geographic location, weather conditions, driver reputation, etc.

Figure 2:
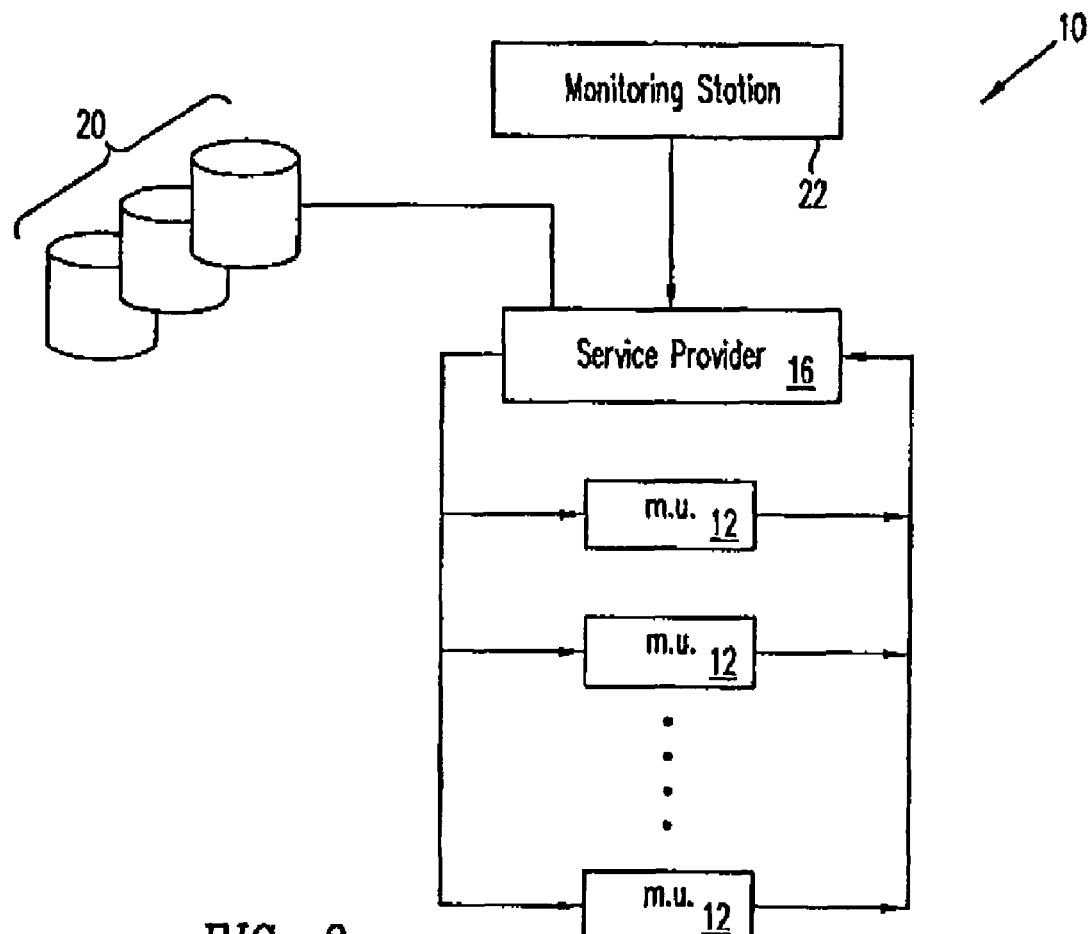
FIG. 2 is a first embodiment of the system where the data from the mobile units are sent to the computer.
Figure 3:
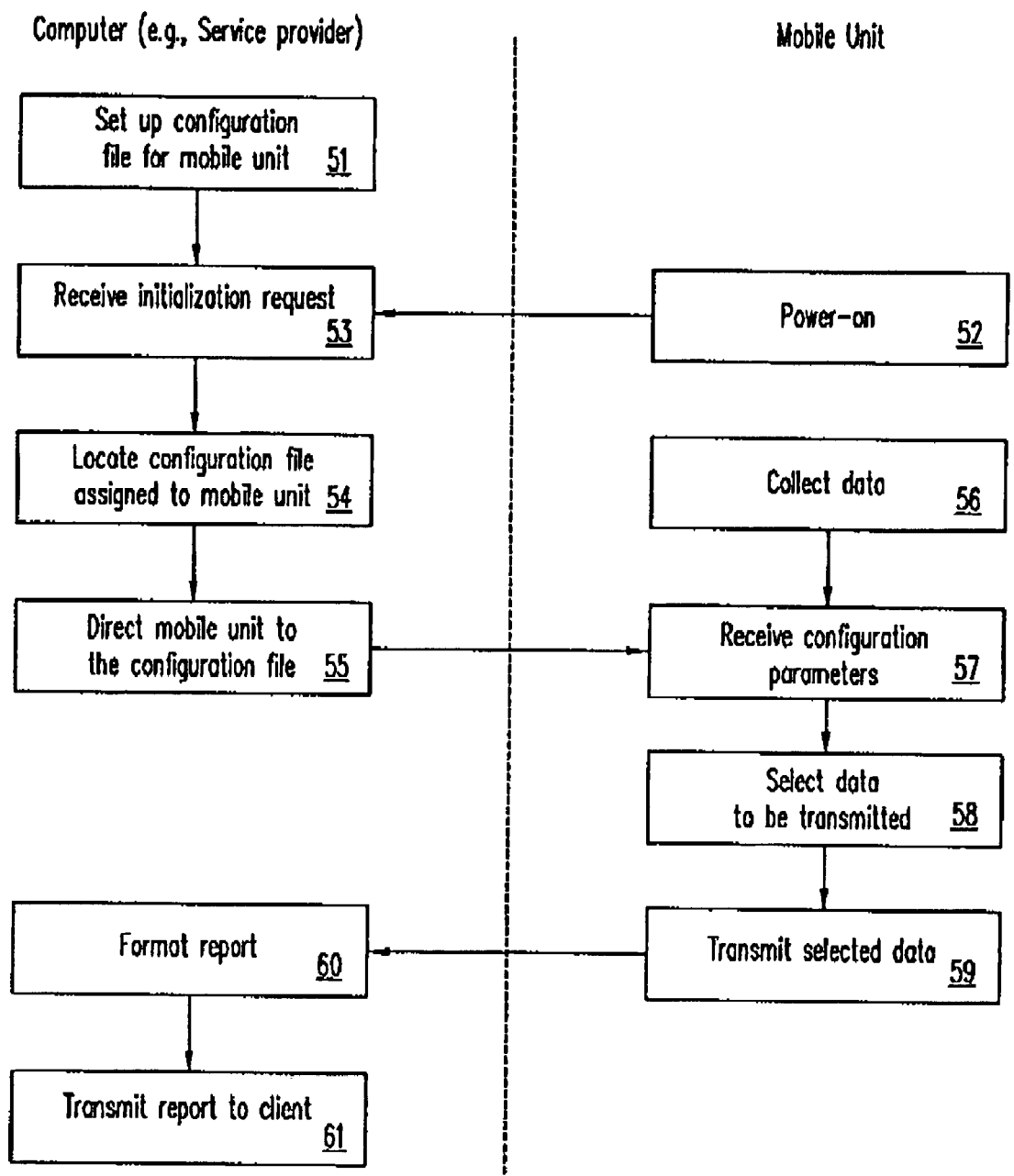
FIG. 3 is a flowchart showing the actions of the computer and the monitoring station in this first embodiment.

FIG. 2 is a first embodiment of the system 10 where the data from the mobile units are sent back to the computer 16, which in this case belongs to the service provider, so that the monitoring station 22, which in this case belongs to the client, receives the mobile unit data from the service provider's computer 16. FIG. 3 is a flowchart showing the actions of the computer 16 and the monitoring station 22 in this first embodiment.

As shown in FIG. 3, the computer 16 sets up a configuration file (step 51) for a particular mobile unit when the mobile unit is first registered with the system 10. When the mobile unit 12 is first powered on (step 52), it goes through a preprogrammed initialization process whereby it contacts the service provider 16. The service provider 16, when contacted by the mobile unit 12 (step 53), uses a table to find the location of the configuration file that contains the configuration parameters intended for this particular mobile unit 12 (step 54). The table may be indexed by mobile unit identification number. The identified configuration parameters are forwarded to the mobile unit (step 55), which then receives the configuration parameters (step 57) and sorts through the data to select what is required by the configuration parameters (step 58). Since the mobile units 12 are preprogrammed to collect certain data (e.g., position data, air bag status, ignition status), those data are continually collected (step 56) at a preprogrammed time interval. In the prior art, all the collected data was sent to a central station. However, in the system 10, the data are pre-sorted so that only the data that is needed to prepare the report in the client-requested format is transmitted (step 59). The computer 16, upon receiving the requested data, formats the data into a report (step 60) and sends the report to the client station (step 61).

Preferably, the mobile unit 12 processes the collected data so that the data is already in a format that is meaningful to the computer 16 when the data is transmitted. However, in some cases, the mobile unit 12 sends "raw" data that needs processing and the computer 16 processes the received data. The mobile unit 12 time-stamps the data it transmits to the computer 16. Thus, for example, the computer 16 may determine the speed of a mobile unit by using the time stamp (speed=distance traveled divided by the time it took to travel the distance).

Figure 4:
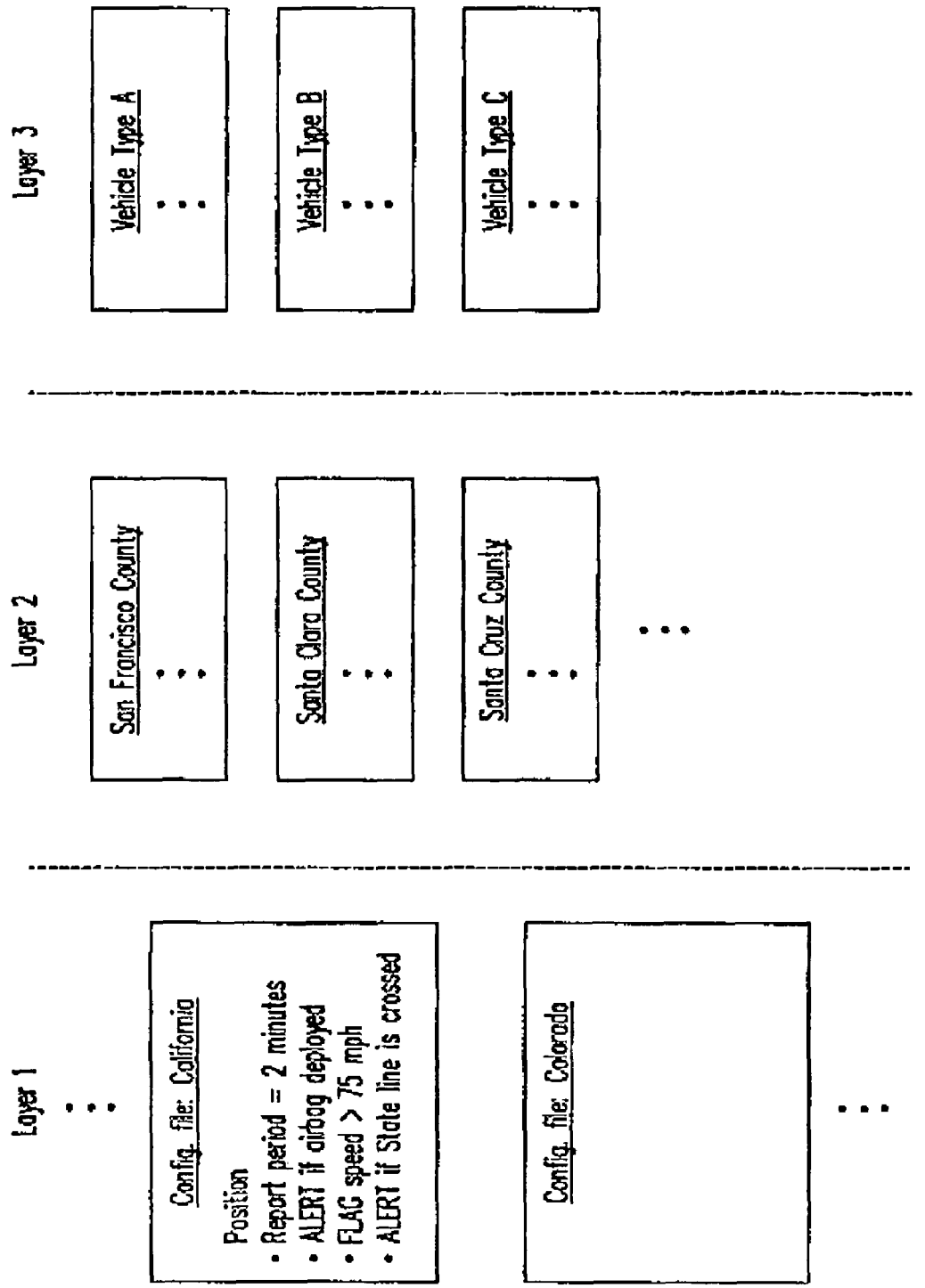
FIG. 4 is a diagram depicting a layered arrangement of configuration files.

The configuration files may be arranged in multiple layers, as illustrated in the example of FIG. 4. Upon being contacted by a mobile unit for the first time, the computer 16 first uses the configuration file assignment table to determine the configuration file in Layer 1 and directs the mobile unit to the Layer 1 configuration file. An exemplary configuration file assignment table is shown in FIG. 8. In the particular example of FIG. 4, Layer 1 configuration files are classified by state. Thus, if a particular mobile unit 12 is in California, the computer 16 will direct the mobile unit to the California configuration file, which has configuration parameters that generically apply to all mobile units in the state of California. The configuration parameters in this Layer 1 California file may dictate that a mobile unit-report its position at a two-minute time interval, to send an alert if an airbag deployment is sensed. In cases where the mobile unit 12 performs the speed calculation, the configuration parameter may instruct the mobile units to report their speeds and to flag speeds above 75 mph. There may be other configuration files in Layer 1 for other states, and the configuration file for each state may be slightly different depending on the street density of each state, speed limit, local weather, etc. The state-specific configuration file includes a command to send an alert if a mobile unit crosses a state line, so that the mobile unit can be assigned a different configuration file in Layer 1. An alert flag and/or sound may be attached to the data that is transmitted to the monitoring station 22 by the service provider 16. Alternatively, the conditions that trigger an alert may be set at the monitoring station 22, so that the alert is activated when the data received by the monitoring station 22 fulfills one of the conditions.

Layer 2 contains a plurality of configuration files that are classified according to county lines. Layer 2, thus, would have many more configuration files than Layer 1 in this example. Each county-specific configuration file may contain, for example, landmarks and planned routes. Landmarks are physical locations that the client company considers as denoting a significant geographical location, and maybe something as large as Golden Gate Park or something as specific as San Francisco City Hall. "Planned routes" are routes that are planned either by the service provider or the client when the delivery is scheduled, based on the starting point and the destination. The configuration file may include a command to send an alert to the computer 16 and/or the monitoring station 22 if there is a significant deviation from the planned route. The county-specific configuration files may also include a command to send an alert if a mobile unit approaches a county line, so that the mobile unit can be regrouped and a different configuration file (either must in Layer 2 or in both Layer 1 and Layer 2) can be assigned.

Layer 3 may contain a plurality of configuration files classified according to vehicle type. For example, there may be Class A trucks that travel interstate, Class B trucks that stay within a state's boundaries, and Class C trucks that carry perishable goods. The configuration file for Class C mobile units may include an instruction to send an alert if 5 hours have passed since the mobile unit was initialized and the truck is not yet at the destination. On the other hand, the configuration file for Class A mobile units might include an instruction to send an alert to the client if it has been more than 48 hours since initialization and the truck has not reached the destination. In this case, the driver of the delivery trucks would be instructed to initialize the mobile unit when the cargo is unloaded. Upon seeing an alert, an operator monitoring the mobile units at the monitoring station 22 may attempt to contact the driver to see what is happening.

Suppose there is an exemplary Class A delivery truck that is being dispatched from Nevada to make a delivery in Santa Clara County, California. The driver of the truck would turn on the mobile unit when he loads up the truck and is ready to begin driving. The mobile unit then automatically communicates with the computer 16 to continually exchange data that will be turned into a report for the delivery company (i.e., the client at the monitoring station 22). The mobile unit 12 collects data according to the preprogrammed instructions. However, the mobile unit does not transmit all the collected data to the computer 16. Rather, the mobile unit selectively transmits the type of data that is requested by the configuration files according to the configuration parameters, which reflect the information that the client is interested in tracking. Applying the configuration file layers of FIG. 4, the particular truck would send data every 2 minutes (according to Layer 1). Once the truck crosses the California state line, an alert goes off to inform the client that the truck crossed the state line (according to Layer 1). An alert would also be sent when the truck passes certain landmarks in Santa Clara County (according to Layer 2). If 48 hours passed since the truck was loaded, the client will be alerted (according to Layer 3).

The multi-layer structure of the configuration files imparts flexibility to the client control of mobile units. For example, if there is a storm in three counties in California, the client can go into Layer 2 of the configuration files and include a command to issue an alert if the speed exceeds 55 mph. This command will override the generic 75 mph alert limit set in the Layer 1 configuration file, but only for the three affected counties. Thus, the 75 mph limit would still apply to trucks in all the other counties. When the storm clears up, the client can go into Layer 2 and delete this restriction. The same configuration can be applied to multiple mobile units with one entry, instead of reconfiguring each mobile unit separately.

There is no limit to the number of layers that can be incorporated into a configuration file, or to how many classes there can be in a layer. Layers may be added or removed. A person of ordinary skill in the art will appreciate that this layered structure of the configuration files can be exploited to cluster the mobile units as broadly or as specifically as is suitable to a client's needs. At the most specific level, there could be a configuration layer that is specific to a mobile unit identification number.

After the very first power-on, which is programmed to trigger an initialization process whereby the mobile unit 12 contacts the computer 16, the configuration files may be used to control the manner in which the initialization process is triggered. When a mobile unit 12 is powered on for the very first time, it is preprogrammed to contact the computer 16 to obtain the configuration parameters that are specifically intended for it. If the configuration file includes a command to re-initialize at 7 a.m. daily, the mobile unit will re-read its configuration file(s) at 7 a.m. everyday after the very first initialization. If the mobile unit is not turned on at 7 a.m., it may automatically turn on and re-initialize. The initialization may also be performed in response to a manual command from the client or the truck driver. This manual initialization option is handy for unexpected situations, for example if the truck battery died and the mobile unit could not operate for a while. When the battery is replaced, the driver can manually initialize the mobile unit 12. In some cases, the mobile unit 12 is programmed to automatically initialize after a hardware repair.

The initialization parameter in the configuration files may be set with a timer. The timer function is useful if a client wants its mobile units all across the country to download their configurations at the same time so that there won't be different groups of trucks acting according to different configurations. The mobile units 12 could download the new configuration parameters with the timer data (which would be part of the configuration file). In this case, the mobile units will download the configuration files but not activate or use them until the time indicated by the timer. This timer function helps synchronize the mobile units 12 so that they act consistently according to the same configuration files regardless of what time they were last initialized. The timer function can also be used to activate different groups of mobile units 12 sequentially according to a predetermined order.

Some embodiments of system 10 allow there to be multiple versions of one configuration file. Different versions may have different fields or different parameter values. For example, there may be a version for rainy days, a version for foggy/snowy days, and a version for sunny days. This way, the client can designate the version that applies depending on the weather conditions of the relevant region.

The memory at the computer 16 may store geographical parameters, communication parameters, and device operations, among other data. Geographical parameters include maps, landmarks (e.g., the Civic Center) and boundaries (zip code, state/county/city lines). In some cases, there is an electronic map stored at the computer 16 on which x-vertice polygons are used to divide the country into sub-areas according to a suitable parameter (e.g., crime rate). Planned routes, mentioned above, may also be part of geographical parameters. These geographical parameters may be combined with reported data to produce reports in the client-requested format.

Typically, the service provider controls and maintains the configuration database 20, and sends reports to its client for some type of fee arrangement. However, in some cases, the client may directly control the service provider. Where the client directly changes the configuration database, the configurations are preferably in a human-readable form so that no special training is needed for changing the configuration parameters. For example, someone may be able to reset the frequency at which a mobile unit reports its location by typing "position report period=2 minutes."

Where the client is allowed to directly change the configuration parameters, a licensing key may be issued by the server station 16 to the client to maintain control over the client's usage of the system.

Figure 5:
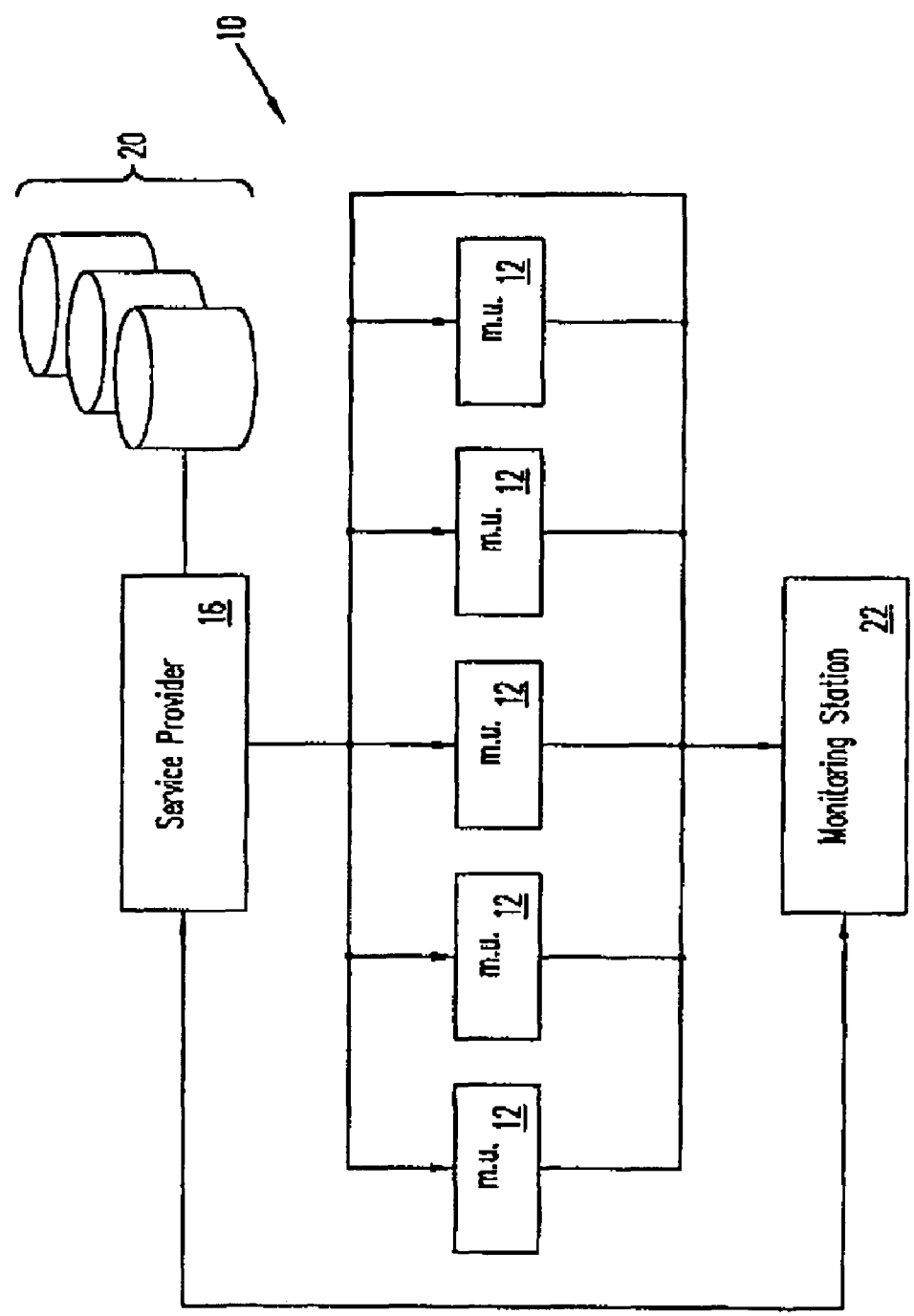
FIG. 5 is a second embodiment of the system where mobile units send data to the monitoring station.
Figure 6:
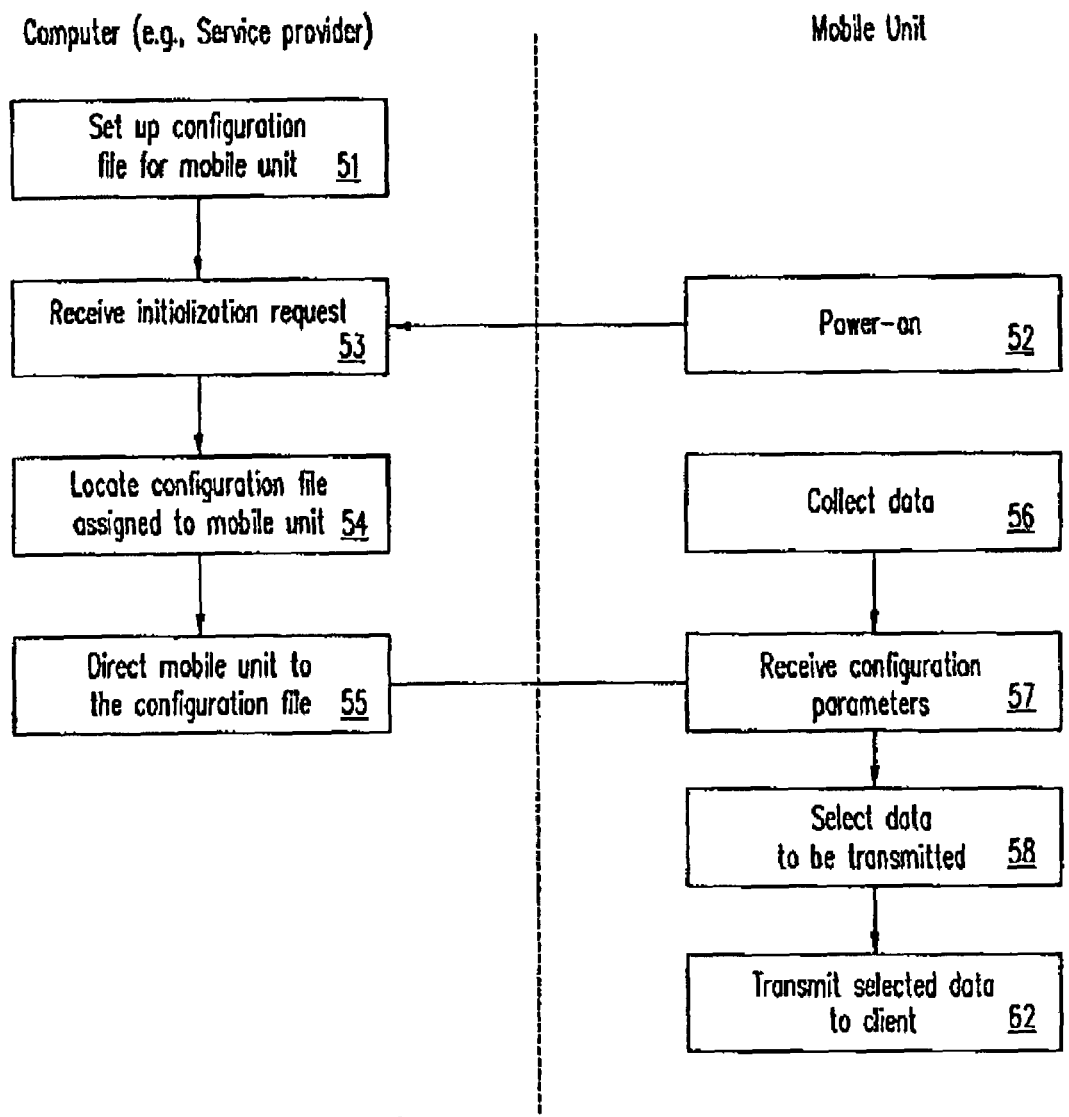
FIG. 6 is a flowchart showing the actions of the computer and the monitoring station in this second embodiment.

FIG. 5 is a second embodiment of the system 10 where the data from the mobile units 12 are sent to the monitoring station 22, which in this case belongs to the client. FIG. 6 is a flowchart showing the actions of the computer 16 and the monitoring station 22 in this second embodiment.

Referring to FIG. 6, steps 51 through 58 are substantially similar to the flowchart of FIG. 3 depicting embodiment 1. However, instead of sending the collected data to the computer 16 like in step 59 of the first embodiment, the data is transmitted to the monitoring station 22 (step 62).

Figure 7:
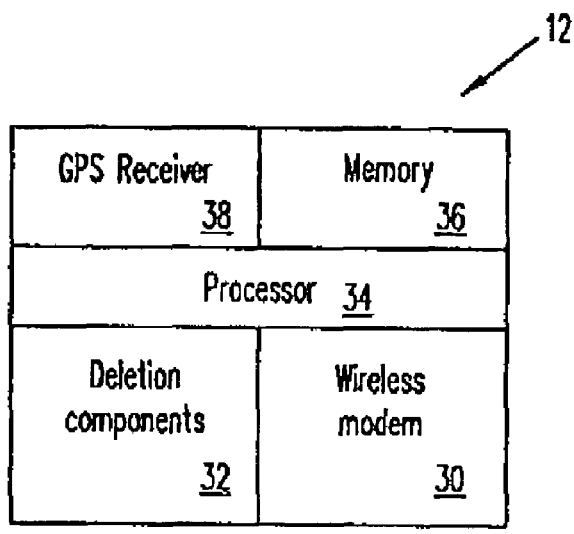
FIG. 7 is a schematic depiction of a mobile unit that includes a wireless modem for communicating with the network

FIG. 7 is a schematic depiction of a mobile unit 12 that includes a wireless modem 30 for communicating with the network 18. In addition, the mobile unit 12 includes various detection components 32 that are designed to measure various physical parameters such as speed, air bag status, door status, ambient temperature, etc., a processor 34 that processes the parameters measured by the detection components 32, and a memory 36 for storing the parameters. The memory 36 may store all the collected data, perhaps with a time stamp. Thus, even if only a subgroup of the collected data are transmitted to the computer 16 to be incorporated into a report, the untransmitted data may be obtained from the memory 36.

The detection components 32 include various probes, sensors, and thermometers connected to different parts of the vehicle, such as the speedometer, the rods, the latch at the door, etc. A person of ordinary skill in the art will know which probes/sensors to use and how to connect the probes/sensors to the processor 34 to implement the detection components 32. The detection components 32 take measurements periodically, in response to a signal from the processor 34. The mobile unit 12 also includes a GPS receiver 38 for receiving position data from a GPS satellite system (not shown). The wireless modem 30 is then used to forward the received position data to the computer 16.

The embodiment of the mobile unit 12 that is depicted in FIG. 7 is just an exemplary embodiment, and some embodiments may have extra components that are not shown in FIG. 7. Likewise, other embodiments may be missing one or more components shown in FIG. 7. Depending on the application, for example, the mobile unit 12 may not have the detection components 32. In other situations, the mobile unit 12 may not have a GPS receiver 38 because it is used only to track vehicle device status. Although the mobile unit 12 is described in the context of something that is installed in a vehicle, the invention is not so limited and it may be implemented as a portable handheld device (e.g., a cellular phone) or a wearable device (e.g., a bracelet, a badge).

FIG. 8 is an exemplary configuration file assignment table 70 used by the computer 16 to determine which configuration file applies to a particular mobile unit. The table 70 is indexed by mobile unit identification number 72, and lists the configuration file locations for the different layers of configuration files. The table 70 may also track other parameters that are not shown explicitly, such as initialization time for each mobile unit.

If desired, encryption may be used for data transmission.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention.

The invention claimed is:

1. A system for collecting data from remote mobile units, the system comprising:
    a configuration database containing a plurality of configuration files, each of which applies to a different group of mobile units and contains a configuration parameter that dictates a reporting pattern for the respective group of mobile units; and
    a mobile unit of the mobile units that collects data at a predefined data collection rate and wirelessly accesses the configuration database to determine the reporting pattern before transmitting a report according to the configuration parameter, wherein the predefined data collection rate is independent of the configuration parameter;
    wherein the reporting pattern defines which of the data that the mobile unit collects is to be included in the report.

2. The system of claim 1, wherein the mobile unit is programmed to access the configuration database upon being powered on for the first time.

3. The system of claim 1, wherein the configuration database is multi-layered, each layer having a plurality of configuration files.

4. The system of claim 3, wherein the configuration database includes a first layer and a second layer of configuration files, wherein each of the mobile units first accesses a configuration file in the first layer and the accessed configuration file directs the mobile unit to a particular configuration file in the second layer for additional configuration parameters.

5. The system of claim 4, wherein the configuration files have different versions, each of which exclusively applies at different times.

6. The system of claim 1 further comprising a computer connected to the configuration database, wherein the computer is useful for changing the configuration parameter in the configuration database.

7. The system of claim 6, wherein the mobile unit collects position data and determines a current mobile unit location.

8. The system of claim 7 further comprising a geographical database connected to the computer, wherein the geographical database stores geographical data.

9. The system of claim 8, wherein the geographical data comprise names and locations of geographical landmarks and boundaries.

10. The system of claim 9, wherein the report includes the current mobile unit location and geographical data.

11. The system of claim 1, wherein the mobile unit transmits the collected data to a computer via a data network.

12. The system of claim 11, wherein the computer is a first computer, further comprising a second computer that is connected to the data network, wherein the second computer is able to view the data reported from the mobile unit but unable to change the configuration parameter.

13. The system of claim 1, wherein the mobile unit comprises a global positioning system (GPS) receiver for collecting position data of the mobile unit.

14. The system of claim 1, wherein the mobile unit transmits less than all of the collected data.

15. The system of claim 1, wherein the mobile unit is installed in a vehicle and comprises detection components that sense a status of a vehicle part such that the status is transmitted according to the configuration parameter.

16. The system of claim 1, wherein one or more of the configuration files comprise a time information accompanying the configuration parameter, wherein the timer information indicates a specific time at which the accompanying configuration parameter is to be used.

17. The system of claim 16, wherein the mobile unit downloads the configuration parameter and the timer information before the specific time but begins using the configuration parameter at the specific time.

18. A method of remotely receiving select data from a mobile unit that collects data at a predefined data collection rate, the method comprising:
   determining an identification number of the mobile unit upon being contacted by the mobile unit through a data network; and
   locating a configuration file that is assigned to the identification number, wherein the configuration file contains parameters that dictate a reporting pattern; wherein the predefined data collection rate is independent of the parameters in the configuration file, and wherein the reporting pattern defines which of the data that the mobile unit collects is to be included in a report.

19. The method of claim 18, wherein locating the configuration file comprises finding a proper configuration file among a plurality of files organized in layers.

20. The method of claim 19, wherein locating the configuration file further comprises finding a correct configuration file in more than one layer of the organized layers.

21. The method of claim 19, wherein the proper configuration file applies to more than one mobile unit that is connected to the data network.

22. The method of claim 18 further comprising:
   receiving position data from the mobile unit; and
   combining the position data with data in a geographical database to determine a mobile unit location.

23. The method of claim 18 further comprising generating an alert if the data transmitted by the mobile unit fulfills a parameter in the configuration file.

24. The method of claim 18, wherein the configuration file also contains a timer information indicating a specific time at which the parameters are to be activated.

25. A mobile device comprising:
   a global positioning system (GPS) receiver for receiving position data at a predefined rate; and
   a wireless transmitter for connecting to a data network, wherein the wireless transmitter obtains a configuration parameter from a remote computer via the data network and transmits a report to the data network according to the configuration parameter, wherein the predefined rate is independent of the configuration parameter, and wherein the configuration parameter defines which of the position data to include in the report.

26. The mobile device of claim 25, wherein the mobile device transmits less than all the position data it receives with the GPS receiver.

27. The mobile device of claim 25, wherein the wireless transmitter obtains a timer information along with the configuration parameter, wherein the timer information indicates a specific time, and wherein the mobile device transmits the position data according to the configuration parameter only after the specific time is reached.

28. The mobile device of claim 26 further comprising a detection component for detecting a mechanical status and an electrical status of parts connected to the mobile device.

29. A method of transmitting data remotely over a data network, the method comprising:
   collecting data at a predefined data collection rate;
   contacting a computer through the data network;
   receiving from the computer a location of a pre-assigned configuration file; and
   pulling configuration parameters from the pre-assigned configuration file to transmit a report according to the configuration parameters, wherein the data collection rate is independent of the configuration parameters, and wherein the configuration parameter defines which of the data that is collected to include in the report.

30. The method of claim 29, wherein the data comprises position data received from global positioning system (GPS) satellites.

31. The method of claim 29 further comprising:
   extracting a timer information from the pre-assigned configuration file, wherein the timer information indicates a specific time at which the configuration parameters are to be used; and
   transmitting the data according to the configuration parameters only after the specific time has been reached.

32. The system of claim 1, wherein the configuration database contains a plurality of layers that are not linked to one another and each of the layers contains configuration files.

33. The mobile device of claim 25, wherein the wireless transmitter obtains a configuration parameter from a plurality of data base layers in the remote computer, wherein the plurality of database layers are not linked to one another.

34. The method of claim 29, wherein the pre-assigned configuration file resides in one of a plurality of database layers that are not linked to one another.

* * * * *